(12) United States Patent
Su et al.

(10) Patent No.: US 11,858,205 B1
(45) Date of Patent: Jan. 2, 2024

(54) COMPOSITES WITH CONTROLLABLE SUPERHYDROPHILIC AND SUPERHYDROPHOBIC INTERFACE PERFORMANCES, A 3D PRINTING METHOD AND 3D PRINTED PARTS

(71) Applicant: Huazhong University of Science and Technology, Wuhan (CN)

(72) Inventors: Bin Su, Wuhan (CN); Zhenhua Wu, Wuhan (CN); Congcan Shi, Wuhan (CN); Yike Li, Wuhan (CN); Chunze Yan, Wuhan (CN); Yusheng Shi, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 17/882,518

(22) Filed: Aug. 5, 2022

(30) Foreign Application Priority Data

Jun. 23, 2022 (CN) .......................... 202210719335.3
Jun. 23, 2022 (CN) .......................... 202210719351.2
Jun. 23, 2022 (CN) .......................... 202210727730.6

(51) Int. Cl.
| | |
|---|---|
| *B29C 64/153* | (2017.01) |
| *B33Y 10/00* | (2015.01) |
| *B33Y 70/00* | (2020.01) |
| *B29K 105/00* | (2006.01) |
| *B29K 101/12* | (2006.01) |

(52) U.S. Cl.
CPC ............ *B29C 64/153* (2017.08); *B33Y 10/00* (2014.12); *B33Y 70/00* (2014.12); *B29K 2101/12* (2013.01); *B29K 2105/251* (2013.01)

(58) Field of Classification Search
None
See application file for complete search history.

(56) References Cited

U.S. PATENT DOCUMENTS

| | | | | | |
|---|---|---|---|---|---|
| 2004/0014865 | A1* | 1/2004 | Keller | ................... | C08K 3/01 |
| | | | | | 427/180 |
| 2009/0042469 | A1* | 2/2009 | Simpson | .............. | D06N 3/0063 |
| | | | | | 442/118 |
| 2018/0057692 | A1* | 3/2018 | Williams | .................. | C09D 7/20 |
| 2023/0183494 | A1* | 6/2023 | Bizet | ........................ | C08J 3/124 |
| | | | | | 264/497 |

FOREIGN PATENT DOCUMENTS

| | | |
|---|---|---|
| CN | 104085107 A | 10/2014 |
| CN | 108127913 A | 6/2018 |
| CN | 109445726 A | 3/2019 |

\* cited by examiner

*Primary Examiner* — Mohammad M Ameen
(74) *Attorney, Agent, or Firm* — Nitin Kaushik

(57) ABSTRACT

The present invention provides composites with controllable superhydrophilic and superhydrophobic performances, a 3D printing method and 3D printed parts. The composites with controllable superhydrophilic and superhydrophobic interface performances comprise hydrophobic powder and/or hydrophilic powder and jointing phase powder, wherein the jointing phase powder is thermoplastic polymers. The present invention can print the parts with a continuous wettability change from superhydrophilic to superhydrophobic performances by regulating the mass percentage of the hydrophobic powder, the hydrophilic powder and the jointing phase powder. Furthermore, the present invention can prepare the models with various shapes according to different application scenes, and regulate the interface wettability performances of the models.

1 Claim, 22 Drawing Sheets

COMPOSITES WITH CONTROLLABLE SUPERHYDROPHILIC AND SUPERHYDROPHOBIC INTERFACE PERFORMANCES, A 3D PRINTING METHOD AND 3D PRINTED PARTS

CROSS-REFERENCE TO RELATED APPLICATIONS

The application claims priority to Chinese patent application No. 2022107193353; No. 2022107277306 and No. 2022107193512, filed on Jun. 23, 2022, the entire contents of which are incorporated herein by reference.

TECHNICAL FIELD

The present invention relates to 3D printing, polymer material processing and interface materials of the physical and chemical crossing technical field, in particular to composites with controllable superhydrophilic and superhydrophobic interface performances, a 3D printing method and 3D printed parts.

BACKGROUND

Through biological evolution eons ago, many organisms on the earth have evolved some excellent performances to adapt to the living environment, among which the most representatives is the superhydrophobic and superhydrophilic properties. Inspired by nature creatures, scientists have explored the mechanism of superhydrophobic materials and superhydrophilic materials and developed many excellent superhydrophobic materials and superhydrophilic materials. However, the research of superwetting materials is mainly aimed at the preparation of single superwetting properties, which is difficult to meet the needs of practical application. Therefore, it is urgent to develop a controllable method for preparing composites with specific interfacial wettability.

The prior art disclosed a preparation method of metal mesh with controllable wettability for oil-water separation. The microporous metal mesh was prepared by using a pulse laser, and then the superhydrophobic/superhydrophilic mesh was obtained by modifying with low surface energy materials. The prior art further disclosed a wettability adjustable polymer film and its preparation method. The polypyrrole layer doped with dioctyl sulfosuccinate was loaded on a stainless steel mesh, and the switch between superhydrophobicity and superhydrophilicity could be achieved by changing a redox status of the polymer film. The prior art disclosed a preparation method for an adjustable superwettability copper surface, in which metal copper was soaked into an ammonium bicarbonate solution or an ammonium carbonate solution. The basic cupric carbonate of a micro-nano structure could be fabricated on the surface of the copper. The superhydrophilic, underwater superoleophobic, superhydrophobic or superoleophobic copper surfaces could be obtained by modifying different grafts on the basic copper carbonate. By changing the composition of the interface material, the above prior arts achieved adjustment of superhydrophobic and superhydrophilic points on material surfaces. However, they cannot realize the control of continuous changes from superhydrophilic to superhydrophobic performances.

3D printing is a rapid prototyping technology, also known as additive manufacturing, which is based on digital model files and uses metal or plastic powders and other adhesive materials to construct objects by selective laser sintering them. It is often used to make models in mold making, industrial design and other fields, and then gradually served in the direct manufacture of some products. However, 3D printing has not been used to prepare controllable wettability materials.

SUMMARY

In view of this, the present invention provides composites with controllable superhydrophilic and superhydrophobic interface performances, a 3D printing method and 3D printed parts, so as to solve or at least partially solve the technical problems in the prior arts.

In the first aspect, the present invention provides composites with controllable superhydrophilic and superhydrophobic interface performances, comprising hydrophobic powders and/or hydrophilic powders and jointing phase powders, wherein the jointing phase powders are thermoplastic polymers.

Further, wherein the hydrophobic powders comprise at least one of polytetrafluoroethylene, polyvinylidene fluoride and hydrophobic fumed silica.

Further, wherein the hydrophilic powders comprise at least one of hydrophilic fumed silica, hydrophilic mica powder, glass bead, copper oxide, aluminium oxide, calcium carbonate, titanium dioxide and magnesium oxide.

Further, wherein the thermoplastic polymer comprises at least one of polypropylene, polyethylene, polyinyl chloride, polystyrene, nylon, polycarbonate, polymethylmethacrylate, epoxy resin, phenolic resin, polyamide and polysulfone.

Further, if the composites with controllable superhydrophilic and superhydrophobic interface performances comprise the hydrophobic powder, the hydrophilic powder and the jointing phase powder, the composites comprise the following components in parts by weight: 0.001-5 parts of hydrophobic powder, 0.001-90 parts of hydrophilic powder and 10-100 parts of jointing phase powder.

If the composites with controllable superhydrophilic and superhydrophobic interface performances comprise the hydrophilic powder and the jointing phase powder, the hydrophilic powder comprises at least one of hydrophilic fumed silica, hydrophilic glass bead and hydrophilic mica powder, wherein the particle size of hydrophilic fumed silica is 5-100 nm, the particle size of hydrophilic glass bead is 1-75 μm, and the particle size of hydrophilic mica powder is 0.5-90 μm. The jointing phase powder comprises at least one of polypropylene, polyethylene, polyinyl chloride, polystyrene, nylon, polycarbonate, polymethylmethacrylate, epoxy resin, phenolic resin, polyamide and polysulfone. The particle size of the jointing phase powder is 1-100 μm. The mass percentage of the hydrophilic powder in the composites with controllable superhydrophilic and superhydrophobic interface performances is 3-90%.

If the composites with controllable superhydrophilic and superhydrophobic interface performances comprises the hydrophobic powder and the jointing phase powder, the particle size of the jointing phase powder is 1-100 μm. The hydrophobic powder comprises at least one of hydrophobic fumed silica and polytetrafluoroethylene powder, wherein the particle size of hydrophobic fumed silica is 5-100 nm and the particle size of polytetrafluoroethylene powder is 1-80 μm. The mass percentage of hydrophobic powder in the composites with controllable superhydrophilic and superhydrophobic interface performances is 3-36%.

Further, if the composites with controllable superhydrophilic and superhydrophobic interface performances comprise the hydrophobic powder, the hydrophilic powder and the jointing phase powder, the particle sizes of the hydrophobic powder, the hydrophilic powder and the jointing phase powder are all 0.005-100 μm.

In the second aspect, the present invention further provides a preparation method for the composites with controllable superhydrophilic and superhydrophobic interface performances, comprising the following steps: mixing and stirring the hydrophobic powder and/or the hydrophilic powder and the jointing phase powder to obtain the composites with controllable superhydrophilic and superhydrophobic interface performances.

In the third aspect, the present invention further provides a 3D printing method, comprising the following step: providing composites with controllable superhydrophilic and superhydrophobic interface performances; and according to the 3D models of the to-be-manufactured printed parts, using the selective laser sintering process to enable the composites to be formed.

Further, in the 3D printing method, if the composites with controllable superhydrophilic and superhydrophobic interface performances comprise the hydrophobic powder, the hydrophilic powder and the jointing phase powder, the printing parameters are as follows: the laser power of 4-20 W, the scanning speed of 500-4000 mm/s, and the preheating temperature of 25-150° C.

In the fourth aspect, the present invention further provides 3D printed parts which are prepared by the 3D printing method.

Compared with the prior arts, the composites with controllable superhydrophilic and superhydrophobic interface performances, the 3D printing method and the 3D printed parts of the present invention has the following beneficial effects:

1. The composites with controllable superhydrophilic and superhydrophobic interface performances of the present invention comprises the hydrophobic powder and/or the hydrophilic powder and the jointing phase powder, wherein the jointing phase powder is a thermoplastic polymer. By regulating the mass percentage of the hydrophobic powder, the hydrophilic powder and the jointing phase powder, the present invention can print a part with a continuous change from superhydrophilic to superhydrophobic performances, which will be suitable for different application scenes. The raw materials used in the present invention are industrial-grade production materials, nontoxic and low cost, endowing the potential of large-scale production. The composites with controllable superhydrophilic and superhydrophobic interface performances of the present invention have a wide application prospect in many fields such as biochemistry, biomedicines, material science, environment monitoring, clinical medicines, gene analysis, cell imaging and optical instruments, which belong to high value-added products.

2. The 3D printing method of the invention has the advantages of simple method, easy process control, low production cost, and easy industrial production. It can be customized for customers to prepare various industrial parts or even works of art.

DETAILED DESCRIPTION OF THE EMBODIMENTS

Figure 1:
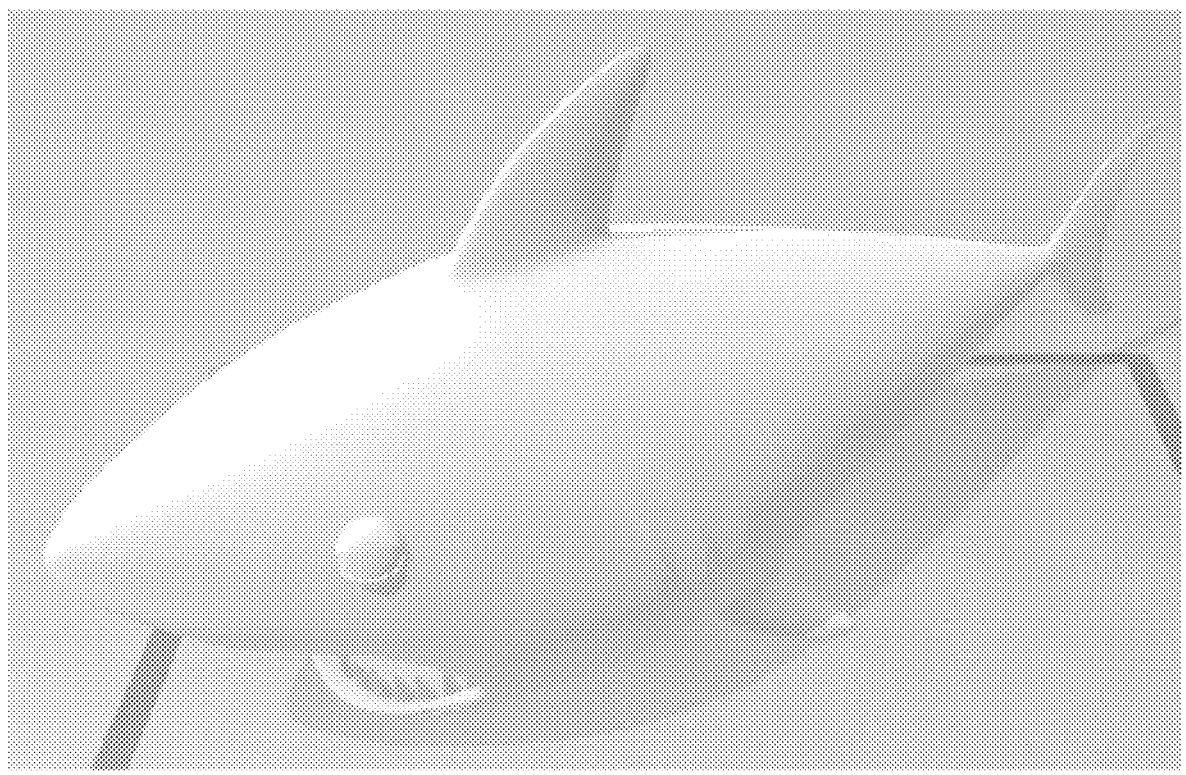
FIG. 1 is the schematic diagram of a 3D model of the to-be-manufactured printed part constructed by using a drawing software according to one embodiment of the present invention.

The embodiments of this application provide composites with controllable superhydrophilic and superhydrophobic interface performances, comprising hydrophobic powder and/or hydrophilic powder and jointing phase powder, wherein the jointing phase powder is thermoplastic polymers.

The composites with controllable superhydrophilic and superhydrophobic interface performances provided by this application are composed of the hydrophobic powder and the jointing phase powder, or composed of the hydrophilic powder and the jointing phase powder, or composed of the hydrophobic powder, the hydrophilic powder and the jointing phase powder. In these applications, the interface performances of the composites can be continuously changed from the superhydrophilicity to the superhydrophobicity by regulating the mass percentage of the hydrophobic powder, the hydrophilic powder and the jointing phase powder, achieving the controllable superhydrophilic and superhydrophobic performances.

In some embodiments, the hydrophobic powders comprise at least one of polytetrafluoroethylene, polyvinylidene fluoride and hydrophobic fumed silica.

In some embodiments, the hydrophilic powders comprise at least one of hydrophilic fumed silica, glass bead, copper oxide powder, aluminium oxide powder, calcium carbonate powder, titanium dioxide powder and magnesium oxide powder.

In some embodiments, the thermoplastic polymer comprises at least one of polypropylene powder, polyethylene powder, polyinyl chloride powder, polystyrene powder, polycarbonate powder, epoxy resin powder, phenolic resin powder, polyamide powder and polysulfone powder.

In some embodiments, the composites with controllable superhydrophilic and superhydrophobic interface performances comprise the following components in parts by weight: 0.001-5 parts of hydrophobic powder, 0.001-90 parts of hydrophilic powder and parts of jointing phase powder.

In some embodiments, if the composites with controllable superhydrophilic and superhydrophobic interface performances comprise the hydrophilic powder and the jointing phase powder, the hydrophilic powder comprises at least one of hydrophilic fumed silica, hydrophilic glass bead and hydrophilic mica powder, wherein the particle size of hydrophilic fumed silica is 5-100 nm, the particle size of hydrophilic glass bead is 1-75 μm, and the particle size of hydrophilic mica powder is 0.5-90 μm. The jointing phase powder comprises at least one of hydrophilic phenolic resin and hydrophilic epoxy resin. The particle size of the jointing phase powder is 1-100 μm. The mass percentage of the hydrophilic powder in the composites with controllable superhydrophilic and superhydrophobic interface performances is 3-90%. Specifically, if the hydrophilic powder is just the hydrophilic fumed silica, the mass percentage of the hydrophilic fumed silica in the composites with controllable superhydrophilic and superhydrophobic interface performances is 3-6%; if the hydrophilic powder is just the hydrophilic glass bead, the mass percentage of the hydrophilic glass bead in the composites with controllable superhydrophilic and superhydrophobic interface performances is 60-90%; and if the hydrophilic powder is just the hydrophilic mica powder, the mass percentage of the hydrophilic mica powder in the composites with controllable superhydrophilic and superhydrophobic interface performances is 30-80%.

In some embodiments, if the composites with controllable superhydrophilic and superhydrophobic interface performances comprise the hydrophobic powder and the jointing phase powder, the particle size of the jointing phase powder is 1-100 μm; the hydrophobic powder comprises at least one of hydrophobic fumed silica and polytetrafluoroethylene powder. The particle size of hydrophobic fumed silica is 5-100 nm, and the particle size of polytetrafluoroethylene powder is 1-80 μm. The mass percentage of hydrophobic powder in the composites with controllable superhydrophilic and superhydrophobic interface performances is 3-36%. Specifically, if the hydrophobic powder is just the hydrophobic fumed silica, the mass percentage of the hydrophobic fumed silica in the composites with controllable superhydrophilic and superhydrophobic interface performances is 3-6%; and if the hydrophobic powder is just the polytetrafluoroethylene powder, the mass percentage of the polytetrafluoroethylene powder in the composites with controllable superhydrophilic and superhydrophobic interface performances is 15-30%.

In some embodiments, if the composites with controllable superhydrophilic and superhydrophobic interface performances comprise the hydrophobic powder, the hydrophilic powder and the jointing phase powder, the particle sizes of the hydrophobic powder, the hydrophilic powder and the jointing phase powder are all 0.005-100 μm.

Based on the same inventive concept, the embodiments of the present invention further provides a preparation method for the composites with controllable superhydrophilic and superhydrophobic interface performances, comprising the following steps: the hydrophobic powder and/or the hydrophilic powder and the jointing phase powder were uniformly mixed and stirred to obtain the composites with controllable superhydrophilic and superhydrophobic interface performances.

Specifically, the hydrophobic powder and/or the hydrophilic powder and the jointing phase powder are put in a stirrer for stirring and mixing for 1-3 h at a speed of 200-500 r/min, and then mixed powder is sieved with a 50-70-mesh sieve net. The mixed powder can be used for 3D printing after being sieved with the 50-70-mesh sieve net, in order to avoid the particle aggregations.

Based on the same inventive concept, the embodiment of the present invention further provides a 3D printing method, comprising the following steps:

S1. The composites with controllable superhydrophilic and superhydrophobic interface performances are provided.

S2. According to the 3D models of the to-be-manufactured printed parts, the selective laser sintering process is used to enable the composites with controllable superhydrophilic and superhydrophobic interface performances to be formed.

Specifically, the 3D models of the to-be-manufactured printed parts are firstly constructed by using a drawing software and saved in a stl format. Then, the constructed 3D models are imported into the printing equipment. The prepared composites are filled into the powder supply cylinder of the printer. The printing parameters are adjusted to match with the filled composite powder. And finally, the to-be-manufactured printed part can be printed. In this application, the superhydrophobic or superhydrophilic components with stability and wear-resistance are prepared by configuring hydrophobic powder, hydrophilic powder and jointing phase powder of different weight fractions, which can meet the requirements of different wettability for different applications.

Specifically, if the composites with controllable superhydrophilic and superhydrophobic interface performances comprise a mixture of the hydrophilic powder and the jointing phase powder, the hydrophilic powder is embedded into the gaps and surfaces of the jointing phase powder matrix material in the printing process, thereby endowing the formed parts with intrinsic and wear-resistant superhydrophilic performance. Even if the surfaces of the formed parts are strongly worn, the exposed parts still have the superhydrophilic performance.

Specifically, if the composites with controllable superhydrophilic and superhydrophobic interface performances comprise the mixture of the hydrophobic powder and the jointing phase powder, and are printed layer by layer, the hydrophobic powder will be uniformly distributed in the gaps and on the surfaces of the jointing phase, thereby endowing the formed part with intrinsic superhydrophobic performance. Even if the surfaces of the formed parts are strongly worn, the exposed parts still have superhydrophobic performance.

In some embodiments, if the composites with controllable superhydrophilic and superhydrophobic interface performances comprise the mixture of the hydrophobic powder, the hydrophilic powder and the jointing phase powder, the printing parameters are as follows: the laser power of 4-20 W, the scanning speed of 500-4000 mm/s, and the preheating temperature of 25-150° C.

In some embodiments, a specific mode of selective laser sintering processing is as follows: slicing the established 3D model with a thickness of 0.1-0.2 mm layers and using laser to conduct selective regional processing layer-by-layer, in which the jointing phase is dissolved, and then rapidly cooled and cured.

In some embodiments, when the composites with controllable superhydrophilic and superhydrophobic interface performances comprise the mixture of the hydrophilic powder and the jointing phase powder, if the hydrophilic powder is hydrophilic fumed silica, the printing power should increase 1-4 W when the mass percentage of the hydrophilic fumed silica in the composites with controllable superhydrophilic and superhydrophobic interface performances increase 0.8-1.2%; if the hydrophilic powder is hydrophilic glass bead, the printing power should increase 0.5-2 W when the mass percentage of the hydrophilic glass bead in the composites with controllable superhydrophilic and superhydrophobic interface performances increase 8-10%; and if the hydrophilic powder is hydrophilic mica powder, the printing power during forming should increase 0.5-2 W when the mass percentage of the hydrophilic mica powder in the composites with controllable superhydrophilic and superhydrophobic interface performances increase 4-6%.

In some embodiments, if the composites with controllable superhydrophilic and superhydrophobic interface performances comprise the mixture of the hydrophobic powder and the jointing phase powder, the hydrophobic powder is hydrophobic fumed silica, the printing power should increase 3-6 W when the mass percentage of the hydrophobic fumed silica in the composites with controllable superhydrophilic and superhydrophobic interface performances increase 0.8-1.2%; and if the hydrophobic powder is polytetrafluoroethylene powder, the printing power should increase 2-8 W when the mass percentage of the polytetrafluoroethylene powder in the composites with controllable superhydrophilic and superhydrophobic interface performances increase 4-6%.

Based on the same inventive concept, the embodiment of the present invention further provides 3D printed parts, which are prepared by using the 3D printing method.

Specifically, FIG. 1 is the diagram showing a 3D model of the to-be-manufactured printed part constructed by using a drawing software according to one embodiment, wherein the 3D model is a 3D shark model.

Figure 2:
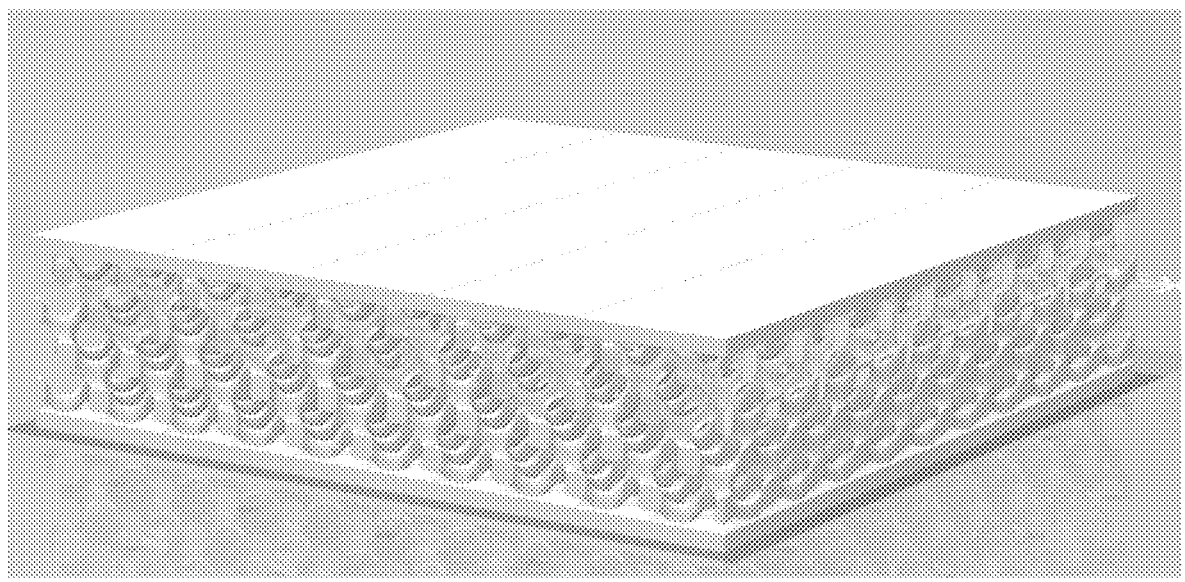
FIG. 2 is the schematic diagram of a 3D model of the to-be-manufactured printed part constructed by using a drawing software according to another embodiment of the present invention.

FIG. 2 is the diagram showing a 3D model of the to-be-manufactured printed part constructed by using a drawing software according to another embodiment, wherein the 3D model is a 3D porous spiral model.

Figure 3:
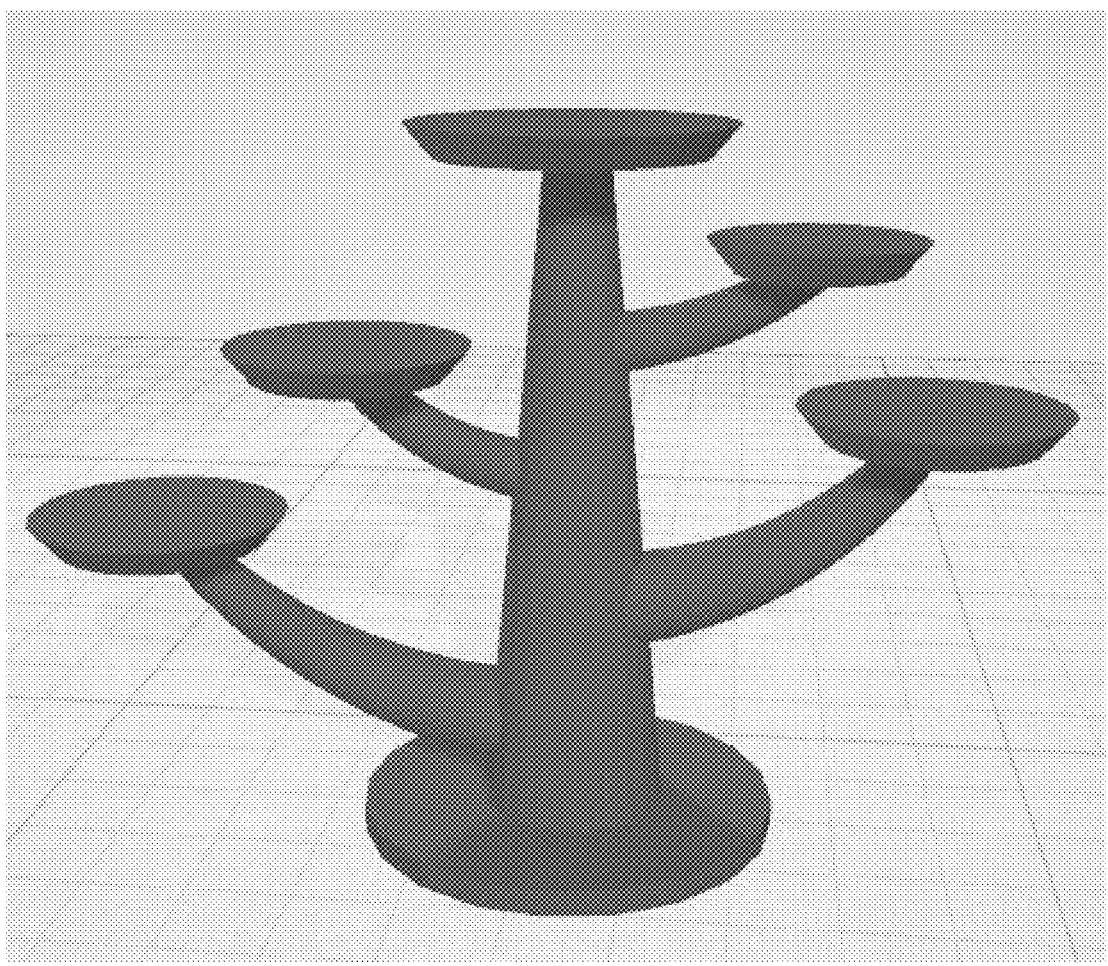
FIG. 3 is the schematic diagram of a 3D model of the to-be-manufactured printed part constructed by using a drawing software according to another embodiment of the present invention.

FIG. 3 is the schematic diagram of a 3D model of the to-be-manufactured printed part constructed by using a drawing software according to another embodiment of the present invention, wherein the 3D model is flower-like shape.

Figure 4:
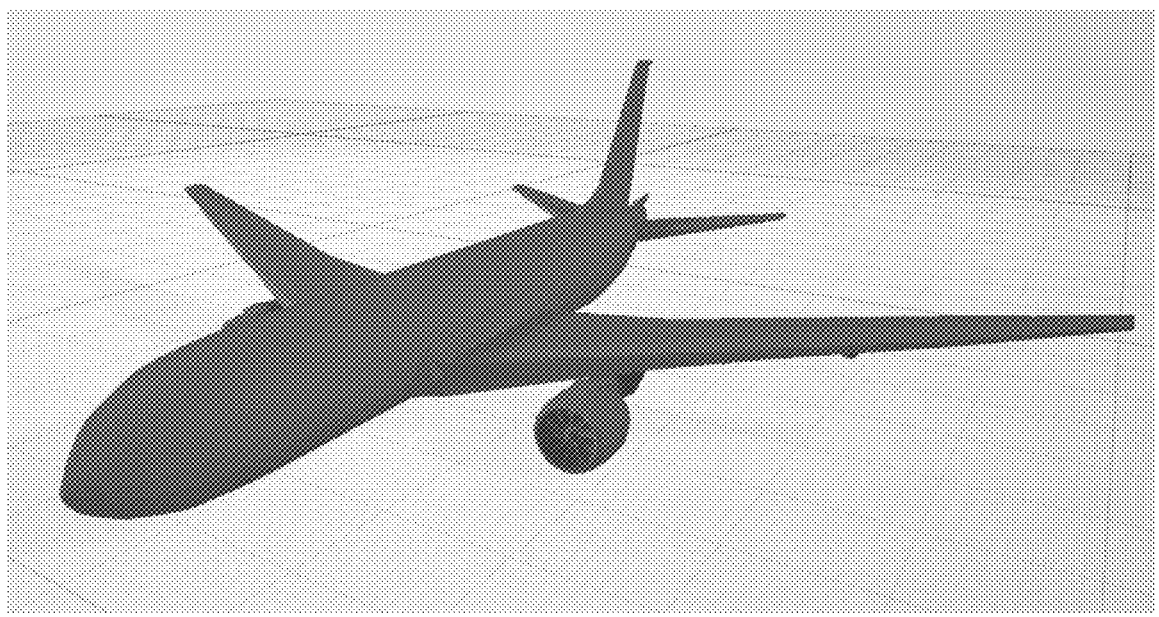
FIG. 4 is the schematic diagram of a 3D model of the to-be-manufactured printed part constructed by using a drawing software according to another embodiment of the present invention.

FIG. 4 is the schematic diagram of a 3D model of the to-be-manufactured printed part constructed by using a drawing software according to another embodiment of the present invention, wherein the 3D model is a 3D airplane model.

The composites with controllable superhydrophilic and superhydrophobic interface performances and the 3D printing method of this application will be further described in the following specific embodiments. This portion describes the content of the present invention in combination with the specific embodiments, but should not be understood as limiting of the present invention. Unless specifically stated otherwise, the technical means used in the embodiments are conventional means familiar to those skilled in the arts.

Embodiment 1

The embodiment of this application provides composites with controllable hydrophilic and hydrophobic performances, comprising the following raw materials: hydrophobic powder, hydrophilic powder and jointing phase powder. The hydrophobic powder selected hydrophobic fumed silica (purchased from Evonik Industries AG). The hydrophilic powder selected hydrophilic glass beads (purchased from Yuefeng Grinding Co., Ltd.). The jointing phase powder selected polypropylene (purchased from Wanhua Group Co., Ltd.). And the particle size of the hydrophobic fumed silica was ~35 nm, the particle sizes of the hydrophilic glass beads and the polypropylene were ~30 µm.

Specifically, the masses of the hydrophobic fumed silica, the hydrophilic glass beads and the polypropylene are shown in Table 1.

TABLE 1

Masses of hydrophobic fumed silica, hydrophilic glass beads and polypropylene

| Mass percentage of hydrophobic fumed silica in composite | Mass of polypropylene | Mass of hydrophobic fumed silica | Mass of hydrophilic glass beads |
|---|---|---|---|
| 0.9 wt % | 582 g | 18 g | 1400 g |
| 1.2 wt % | 576 g | 24 g | 1400 g |

The preparation method for the composites with controllable superhydrophilic and superhydrophobic interface performances comprises the following steps: the hydrophobic fumed silica, the hydrophilic glass beads and the polypropylene were put in a stirrer for stirring and mixing for 2 h at 300 r/min; and the obtained mixture was sieved with a 60-mesh sieve to obtain the composites with controllable superhydrophilic and superhydrophobic interface performances.

The embodiment of the present invention further provides a 3D printing method, comprising the following step:

S1. Providing the composites with controllable superhydrophilic and superhydrophobic interface performances of the embodiment 1;

S2. According to the 3D model for the to-be-manufactured printed part (in this embodiment, the 3D model used is the model shown in FIG. 1), the composites with controllable superhydrophilic and superhydrophobic interface performances were formed by an SLS 3D printing process.

Specifically, when the mass percentage of the hydrophobic fumed silica in the composites with controllable superhydrophilic and superhydrophobic interface performances is 0.9 wt %, the printing parameters are as follows: the preheating temperature of 100° C., the laser power of 15 W, the laser scanning velocity of 1000 mm/s, the scanning interval of 0.1 mm, and the layer thickness of 0.1 mm.

When the mass percentage of the hydrophobic fumed silica in the composites with controllable superhydrophilic and superhydrophobic interface performances is 1.2 wt %, the laser scanning power is increased to 19 W without changing other printing parameters. The printed part requires to be naturally cooled for 3 h before being taken out.

Figure 5:
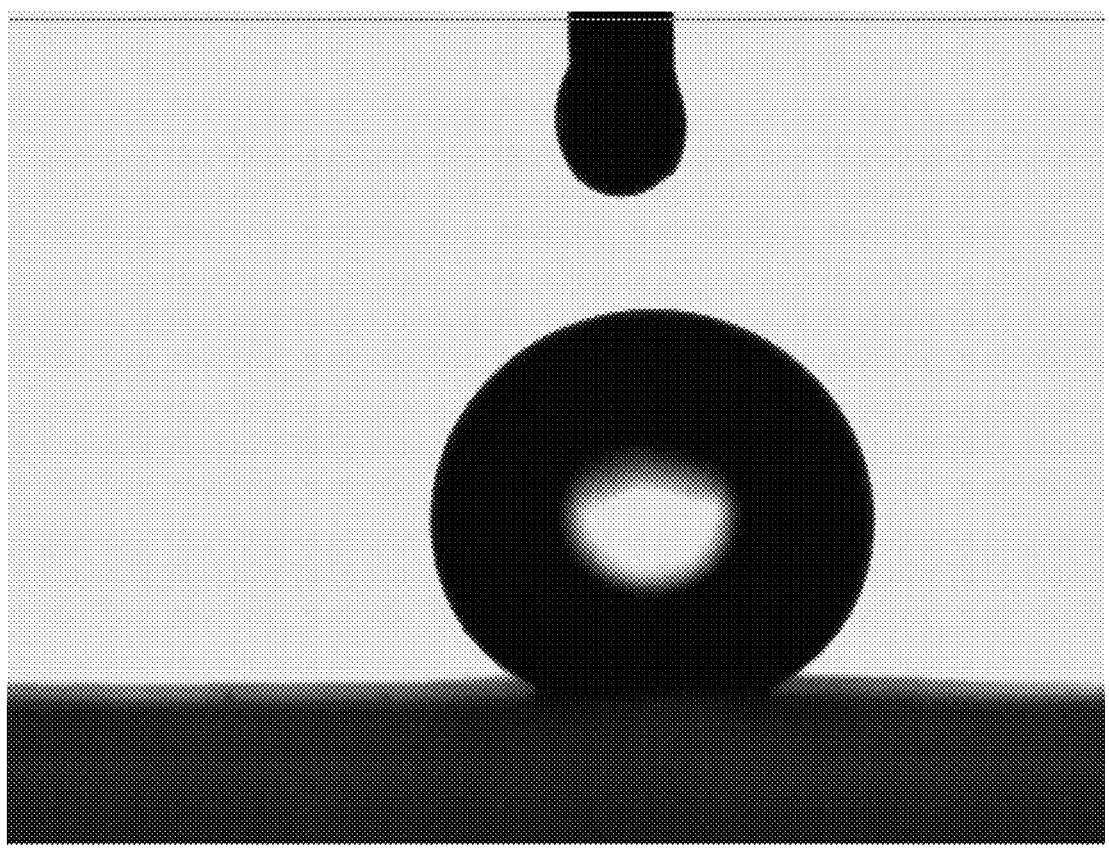
FIGS. 5-6 are the diagrams showing the hydrophobicity of water droplets on the printed parts obtained in embodiment 1.
Figure 6:
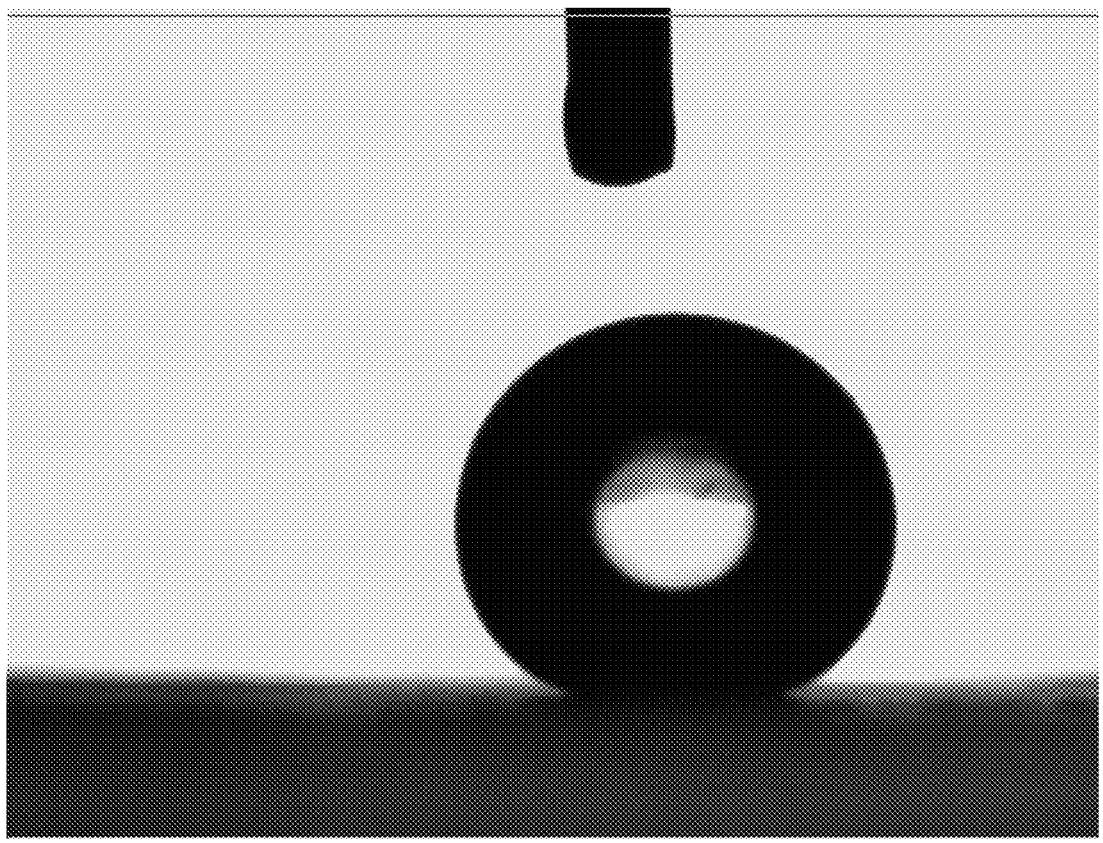
Figure 7:
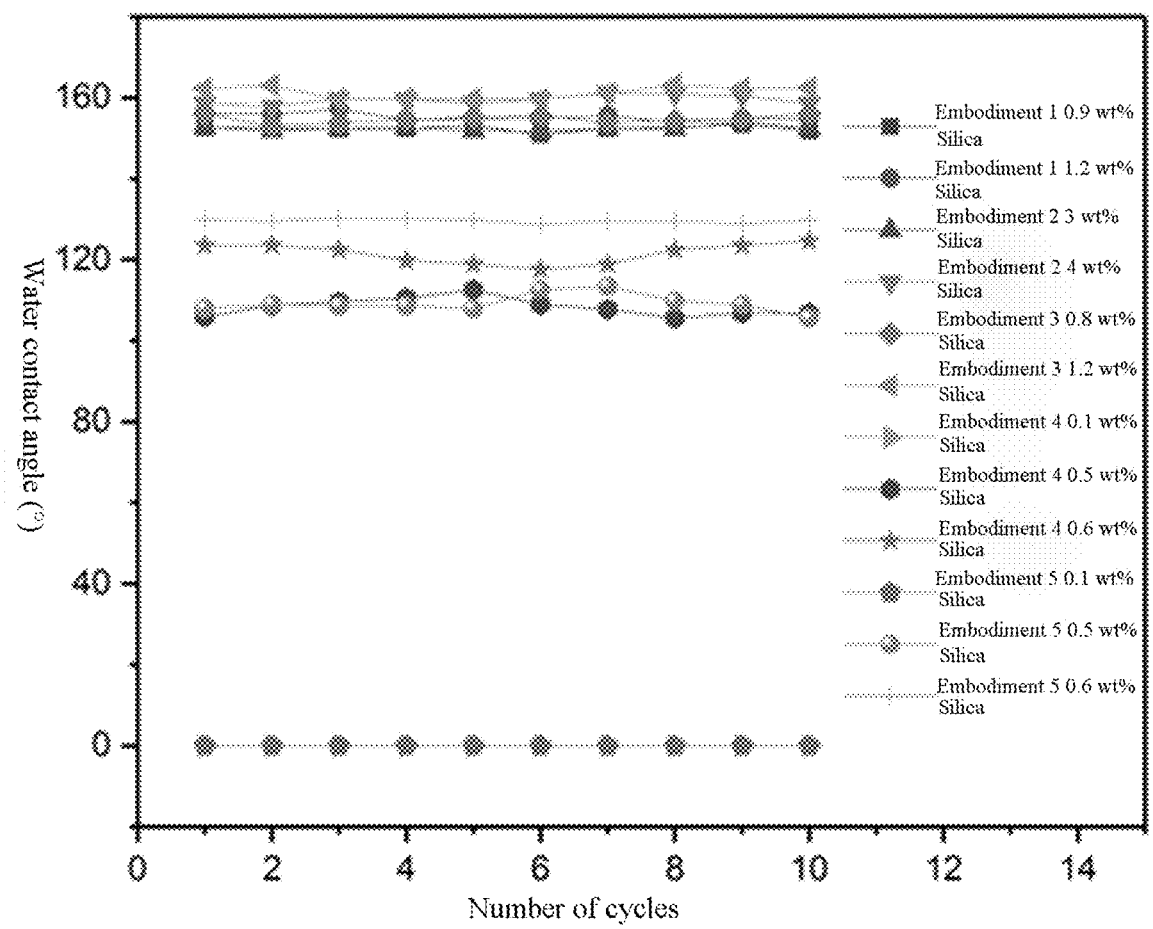
FIG. 7 is the contact angle statistics of different printed parts subjected to different friction cycles in embodiments 1-4.

FIGS. 5-6 are the diagrams showing the hydrophobic performance of water droplets on the printed parts obtained in embodiment 1, wherein the corresponding mass percentages of the hydrophobic fumed silica in the composite of FIG. 5 and FIG. 6 are 0.9 wt % and 1.2 wt %, respectively. In FIGS. 5-6, the contact angles of the water droplets on the printed sample are ~152° and ~156°, respectively. Specifically, the testing method for the hydrophobic performance comprise the following steps: 5 µL of water droplets were added on the surface of the printed sample, the contact angles of the water droplets were recorded by the contact angle instrument. The printed sample was then subjected to a wear-resistance test, which was put on a sandpaper with 180 meshes, followed by placing a 100 g weight on the printed sample, moving the printed sample horizontally back and forth 10 cm as one cycle. The contact angles after different friction cycles were tested, as shown in FIG. 7.

Embodiment 2

The embodiment of this application provides composites with controllable superhydrophilic and superhydrophobic interface performances, comprising the following raw materials: hydrophobic powder, hydrophilic powder and jointing phase powder. The hydrophobic powder selected hydrophobic fumed silica. The hydrophilic powder selected hydrophilic glass beads (purchased from Yuefeng Grinding Co., Ltd.). The jointing phase powder selected phenolic resin (purchased from Wanhua Group Co., Ltd.). The particle sizes of the hydrophobic fumed silica (purchased from Evonik Industries AG), the hydrophilic glass beads and the phenolic resin were ~35 nm, ~30 µm and ~30 µm, respectively. Specifically, the masses of the hydrophobic fumed silica, the hydrophilic glass beads and the phenolic resin are shown in Table 2.

TABLE 2

| Masses of hydrophobic fumed silica, hydrophilic glass beads and phenolic resin | | | |
|---|---|---|---|
| Mass percentage of hydrophobic fumed silica in composite | Mass of phenolic resin | Mass of hydrophobic fumed silica | Mass of hydrophilic glass beads |
| 3 wt % | 340 g | 60 g | 1600 g |
| 4 wt % | 320 g | 80 g | 1600 g |

The preparation method for the composites with controllable superhydrophilic and superhydrophobic interface performances comprises the following steps: the hydrophobic fumed silica, the hydrophilic glass beads and the phenolic resin were put in a stirrer for stirring and mixing for 2 h at 500 r/min, and the mixture was sieved with a 60-mesh sieve to obtain the composites.

The embodiment of the present invention further provides a 3D printing method, comprising the following step:

S1. The composites with controllable superhydrophilic and superhydrophobic interface performances according to embodiment 2 was provided.

S2. According to the 3D model for the to-be-manufactured printed part (in this embodiment, the 3D model used is the model shown in FIG. 2), the selective laser sintering process was used to enable the composites with controllable superhydrophilic and superhydrophobic interface performances to be formed.

Specifically, when the mass percentage of the hydrophobic fumed silica in the composites with controllable superhydrophilic and superhydrophobic interface performances is 3 wt %, the printing parameters are as follows: the preheating temperature of 70° C., the laser power of 13 W, the laser scan velocity of 3000 mm/s, the scanning interval of 0.1 mm, and the layer thickness of 0.1 mm.

When the mass percentage of the hydrophobic fumed silica in the composites with controllable superhydrophilic and superhydrophobic interface performances is 4 wt %, the laser power increases to 14 W without changing other printing parameters. When the printing process completes, the printed parts require to be naturally cooled for 1 h before being taken out.

Figure 8:
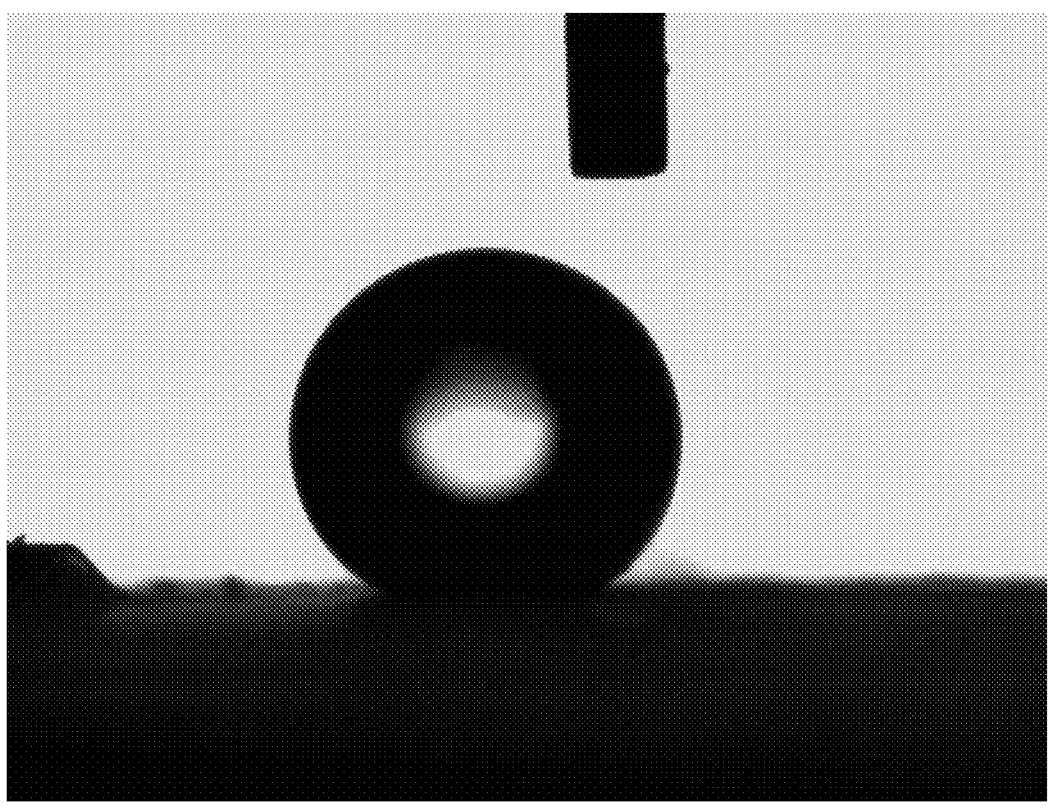
FIGS. 8-9 are the diagrams showing the hydrophobicity of water droplets on the printed parts obtained in embodiment 2.
Figure 9:
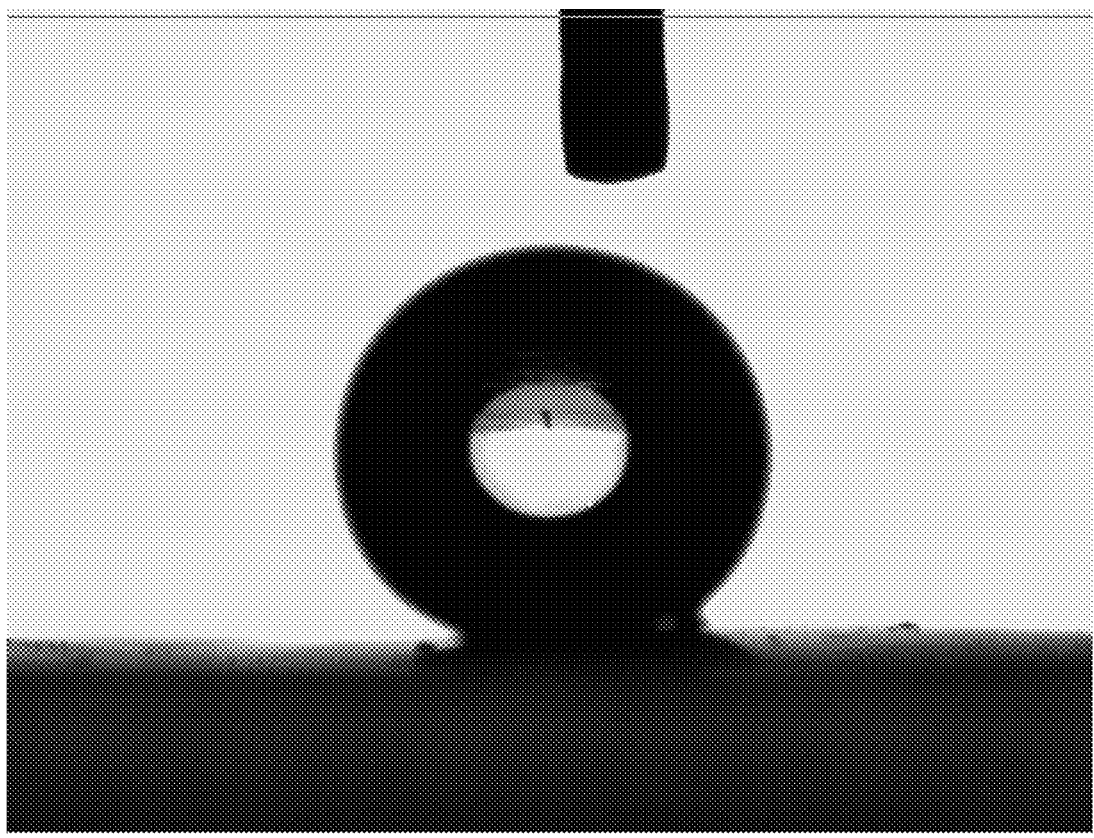

FIGS. 8-9 are the diagrams showing the hydrophobic performance of water droplets on the printed parts obtained in embodiment 2, wherein the corresponding mass percentages of the hydrophobic fumed silica in the composites are 3 wt % and 6 wt %, respectively. The contact angles of water droplets on the printed parts in FIGS. 8-9 are 153° and 161°, respectively. The printed sample was then subjected to a wear-resistance test, which was put on a sandpaper with 180 meshes, followed by placing a 100 g weight on the printed sample, moving the printed sample horizontally back and forth 10 cm as one cycle. The contact angles after different abrasion cycles were tested, as shown in FIG. 7.

Embodiment 3

The embodiment of this application provides composites with controllable superhydrophilic and superhydrophobic interface performances, comprising the following raw materials: hydrophobic powder, hydrophilic powder and jointing phase powder. The hydrophobic powder selected hydrophobic fumed silica. The hydrophilic powder selected hydrophilic calcium carbonate (purchased from Wanhua Group Co., Ltd.). The jointing phase powder selected epoxy resin (purchased from Wanhua Group Co., Ltd.). The particle sizes of the hydrophobic fumed silica (purchased from Evonik Industries AG), the hydrophilic calcium carbonate and the epoxy resin were ~35 nm, ~30 µm and ~30 µm, respectively. Specifically, the masses of the hydrophobic fumed silica, the hydrophilic calcium carbonate and the epoxy resin are shown in Table 3.

TABLE 3

| Masses of hydrophobic fumed silica, hydrophilic calcium carbonate and epoxy resin | | | |
|---|---|---|---|
| Mass percentage of hydrophobic fumed silica in composite | Mass of epoxy resin | Mass of hydrophobic fumed silica | Mass of hydrophilic calcium carbonate |
| 0.8 wt % | 600 g | 16 g | 1400 g |
| 1.2 wt % | 1900 g | 24 g | 1400 g |

The preparation method for the composites with controllable superhydrophilic and superhydrophobic interface performances comprises the following steps: the hydrophobic fumed silica, the hydrophilic calcium carbonate and the epoxy resin were put in a stirrer for stirring and mixing for 1 h at 200 r/min, and the mixture was sieved with a 60-mesh sieve to obtain the composites.

The embodiment of the present invention further provides a 3D printing method, comprising the following step:

S1. The composites with controllable superhydrophilic and superhydrophobic interface performances according to embodiment 3 was provided;

S2. According to the 3D model for the to-be-manufactured printed part (in this embodiment, the 3D model used is the model shown in FIG. 1), the selective laser sintering process was used to enable the composites with controllable superhydrophilic and superhydrophobic interface performances to be formed. Specifically, when the mass percentage of the hydrophobic fumed silica in the composites with controllable superhydrophilic and superhydrophobic interface performances is 0.8 wt %, the printing parameters are as follows: the preheating temperature of 60° C., the laser power of 12 W, the laser scan velocity of 1000 mm/s, the scanning interval of 0.1 mm, and the layer thickness of 0.1 mm.

When the mass percentage of the hydrophobic fumed silica in the composites with controllable superhydrophilic and superhydrophobic interface performances changes to 1.2 wt %, the laser scanning power increases to 14 W without changing other printing parameters. When the printing process completes, the printed parts require to be naturally cooled for 1 h before being taken out.

Figure 10:
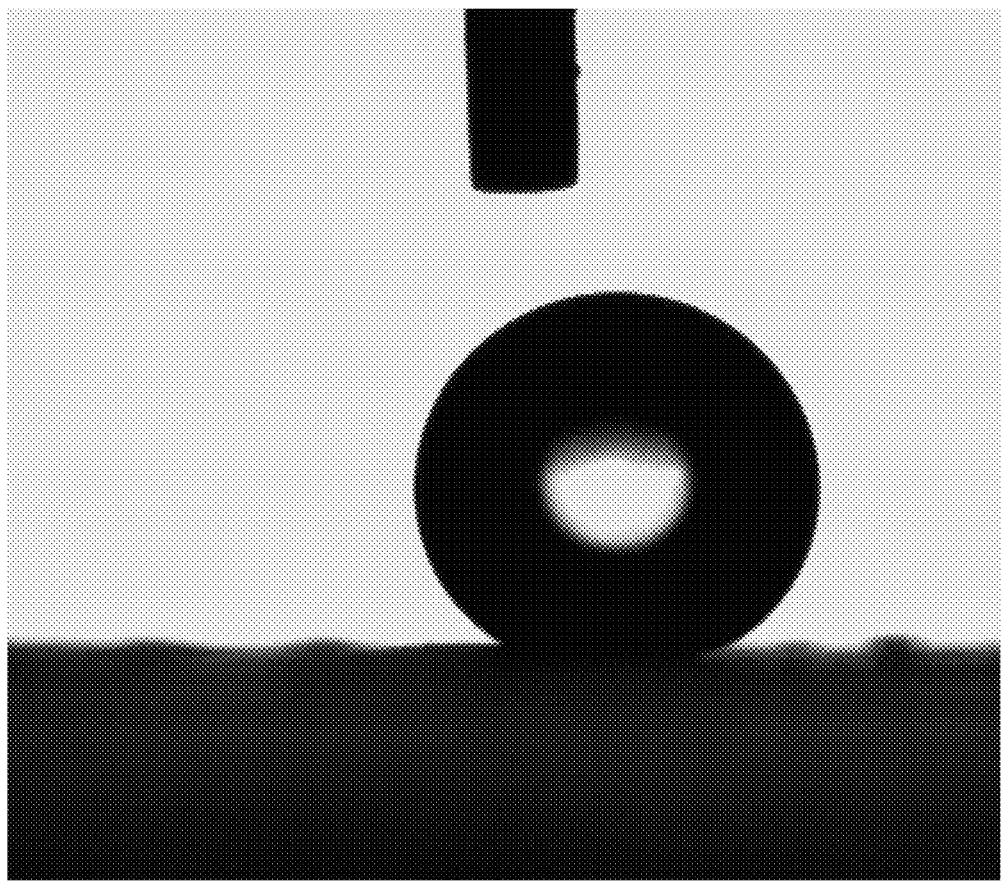
FIGS. 10-11 are the diagrams showing the hydrophobicity of water droplets on the printed parts obtained in embodiment 3.
Figure 11:
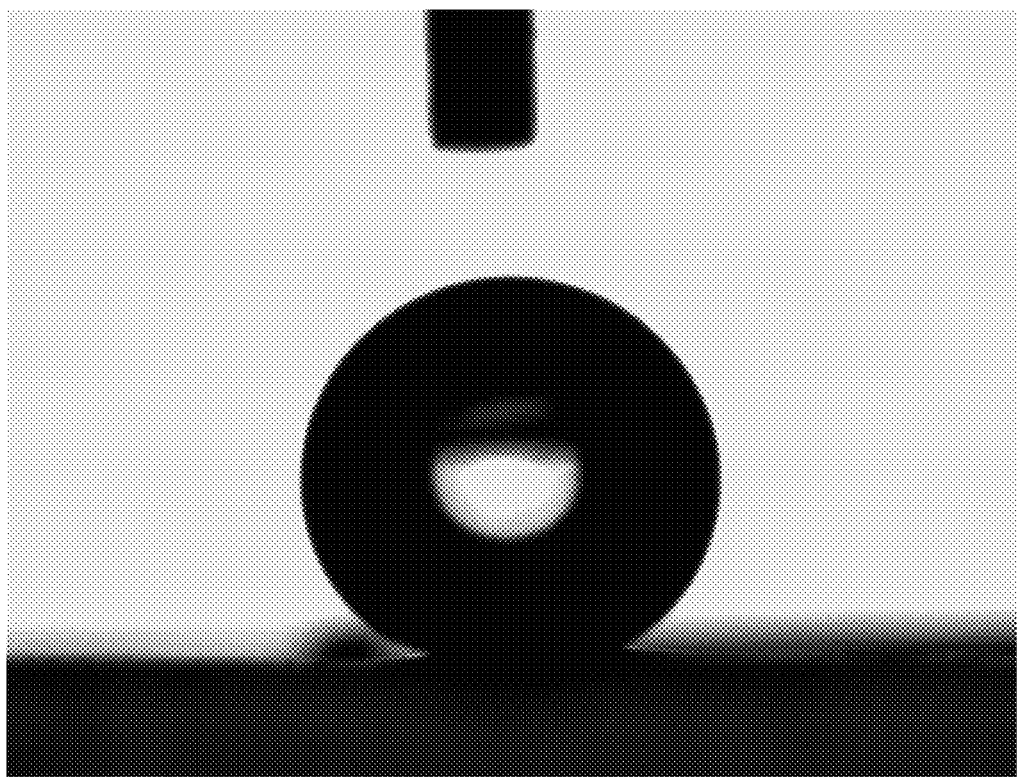

FIGS. 10-11 are diagrams showing the hydrophobic performance of water droplets on the printed part obtained in embodiment 3, wherein the corresponding mass percentage of the hydrophobic fumed silica are 0.8 wt % and 1.2 wt %, respectively. The contact angles of water droplets on the printed part in FIGS. 10-11 are 155° and 162°, respectively. The printed sample was then subjected to a wear-resistance test, which was put on a sandpaper with 180 meshes, followed by placing a 100 g weight on the printed sample, moving the printed sample horizontally back and forth 10 cm as one cycle. The change of the contact angles after different abrasion cycles were tested, as shown in FIG. 7.

Embodiment 4

The embodiment of this application provides the composites with controllable superhydrophilic and superhydrophobic interface performances, comprising the following raw materials: hydrophobic powder, hydrophilic powder and jointing phase powder. The hydrophobic powder selected hydrophobic fumed silica. The hydrophilic powder selected hydrophilic glass beads (purchased from Yuefeng Grinding Co., Ltd.). The jointing phase powder selected phenolic resin (purchased from Wanhua Group Co., Ltd.). The particle sizes of the hydrophobic fumed silica (purchased from Evonik Industries AG), the hydrophilic glass beads and the phenolic resin were ~35 nm, ·30 μm and ~30 μm, respectively.

Specifically, the masses of the hydrophobic fumed silica, the hydrophilic glass beads and the phenolic resin are shown in Table 4.

TABLE 4

Masses of hydrophobic fumed silica, hydrophilic glass beads and phenolic resin

| Mass percentage of hydrophobic fumed silica in composite | Mass of phenolic resin | Mass of hydrophobic fumed silica | Mass of hydrophilic glass beads |
| --- | --- | --- | --- |
| 0.1 wt % | 392 g | 2 g | 1600 g |
| 0.5 wt % | 390 g | 10 g | 1600 g |
| 0.6 wt % | 388 g | 12 g | 1600 g |

The preparation method for the composites with controllable superhydrophilic and superhydrophobic interface performances comprises the following steps: the hydrophobic fumed silica, the hydrophilic glass beads and the phenolic resin were put in a stirrer for stirring and mixing for 3 h at 400 r/min, and the mixture was sieved with a 60-mesh sieve to obtain the composites.

The embodiment of the present invention further provides a 3D printing method, comprising the following step:

S1. The composites with controllable superhydrophilic and superhydrophobic interface performances according to embodiment 4 was provided;

S2. According to the 3D model for the to-be-manufactured printed part (in this embodiment, the used 3D model is the model shown in FIG. 2), the selective laser sintering process was used to enable the composites with controllable superhydrophilic and superhydrophobic interface performances to be formed.

Specifically, when the mass percentage of the hydrophobic fumed silica in the composites with controllable superhydrophilic and superhydrophobic interface performances is 0.1 wt %, the printing parameters are as follows: the preheating temperature of 60° C., the laser power of 6 W, the laser scan velocity of 1000 mm/s, the scanning interval of 0.1 mm, and the layer thickness of 0.1 mm.

When the mass percentages of the hydrophobic fumed silica in the composites with controllable superhydrophilic and superhydrophobic interface performances change to 0.5 wt % and 0.6 wt %, the laser scanning powers should increase to 8 W and 9 W, respectively. When the printing process completes, the printed parts require to be naturally cooled for 1 h before being taken out.

Figure 12:
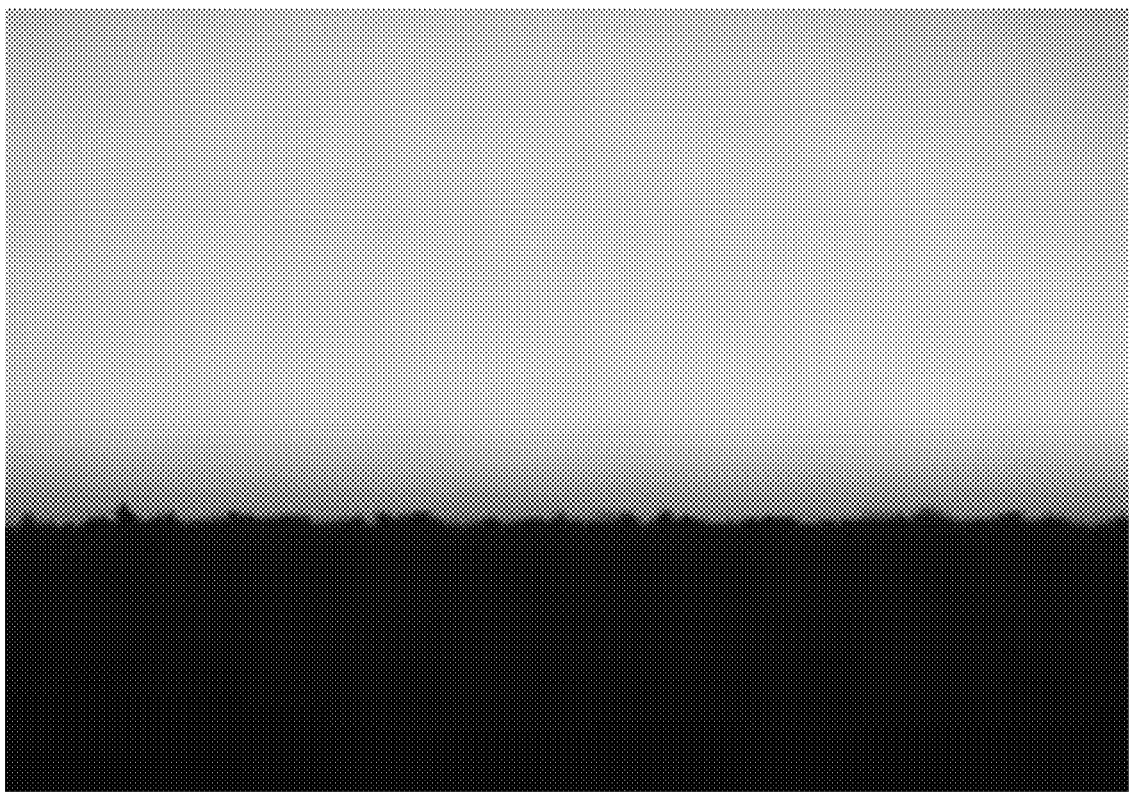
FIGS. 12-14 are the diagrams showing the hydrophobicity of water droplets on the printed parts obtained in embodiment 4.
Figure 13:
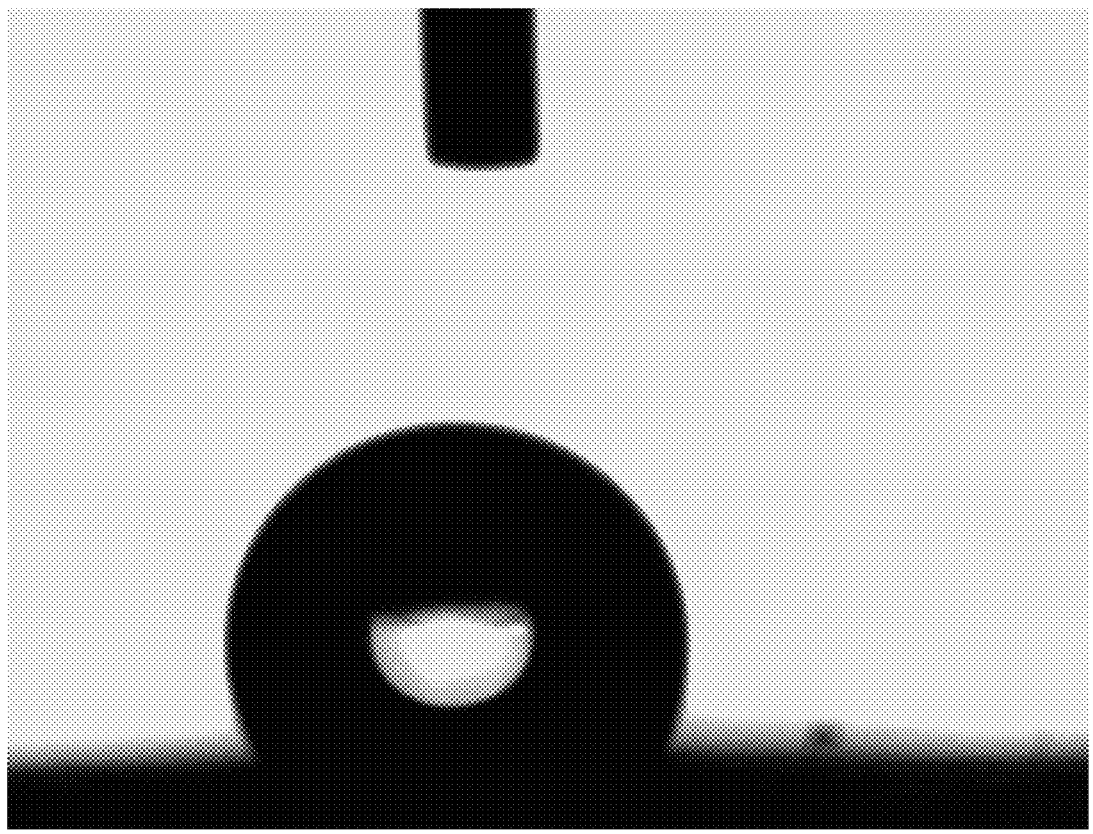
Figure 14:
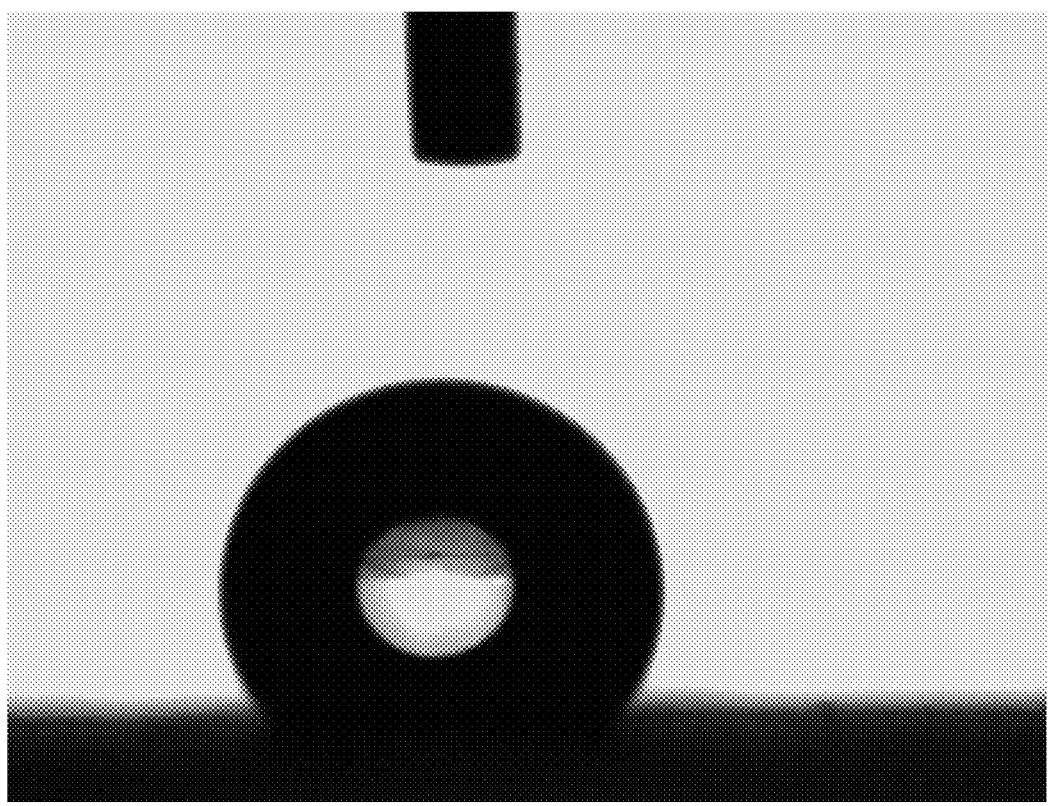

FIGS. 12-14 are the diagrams showing the wettability performance of water droplets on the printed parts obtained in embodiment 4, wherein the corresponding mass percentages of the hydrophobic fumed silica are 0.1 wt %, 0.5 wt % and 0.6 wt %, respectively. The contact angles of the water droplets on the printed parts in FIGS. 12-14 are 0°, 109° and 122°, respectively. The printed sample was then subjected to a wear-resistance test, which was put on a sandpaper with 180 meshes, followed by placing a 100 g weight on the printed sample, moving the printed sample horizontally back and forth 10 cm as one cycle. The change of the contact angles after different abrasion cycles were tested, as shown in FIG. 7.

Embodiment 5

The embodiment of this application provides the composites with controllable superhydrophilic and superhydrophobic interface performances, comprising the following raw materials: hydrophobic powder, hydrophilic powder and jointing phase powder. The hydrophobic powder selected hydrophobic fumed silica. The hydrophilic powder selected hydrophilic glass beads (purchased from Yuefeng Grinding Co., Ltd.). The jointing phase powder selected epoxy resin (purchased from Wanhua Group Co., Ltd.). The particle sizes of the hydrophobic fumed silica (purchased from Evonik Industries AG), the hydrophilic glass beads and the epoxy resin were ~35 nm, ~30 μm and ~30 μm, respectively.

Specifically, the masses of the hydrophobic fumed silica, the hydrophilic glass beads and the epoxy resin are shown in Table 5.

TABLE 5

Masses of hydrophobic fumed silica, hydrophilic glass beads and epoxy resin

| Mass percentage of hydrophobic fumed silica in composite | Mass of epoxy resin | Mass of hydrophobic fumed silica | Mass of hydrophilic glass beads |
| --- | --- | --- | --- |
| 0.1 wt % | 592 g | 2 g | 1400 g |
| 0.5 wt % | 590 g | 10 g | 1400 g |
| 0.6 wt % | 588 g | 12 g | 1400 g |

The preparation method for the composites with controllable superhydrophilic and superhydrophobic interface performances comprises the following steps: the hydrophobic fumed silica, the hydrophilic glass beads and the epoxy resin were put in a stirrer for stirring and mixing for 3 h at 300 r/min, and the mixture was sieved with a 60-mesh sieve to obtain the composites.

The embodiment of the present invention further provides a 3D printing method, comprising the following step:

S1. The composites with controllable superhydrophilic and superhydrophobic interface performances according to embodiment 5 was provided.

S2. According to the 3D model for the to-be-manufactured printed part (in this embodiment, the 3D model used is the model shown in FIG. 1), the selective laser sintering process was used to enable the composites with controllable superhydrophilic and superhydrophobic interface performances to be formed.

Specifically, when the mass percentage of the hydrophobic fumed silica in the composites with controllable superhydrophilic and superhydrophobic interface performances is 0.1 wt %, the printing parameters are as follows: the preheating temperature of 60° C., the laser power of 10 W, the laser scan velocity of 1000 mm/s, the scanning interval of 0.1 mm, and the layer thickness of 0.1 mm.

When the mass percentage of the hydrophobic fumed silica in the composites with controllable superhydrophilic and superhydrophobic interface performances turn to 0.5 wt % and 0.6 wt %, the laser scanning power increases to 12 W and 13 W, respectively. When the printing process completes, the printed parts require to be naturally cooled for 1 h before being taken out.

Figure 15:
FIGS. 15-17 are the diagrams showing the hydrophobicity of water droplets on the printed parts obtained in embodiment 5.
Figure 16:
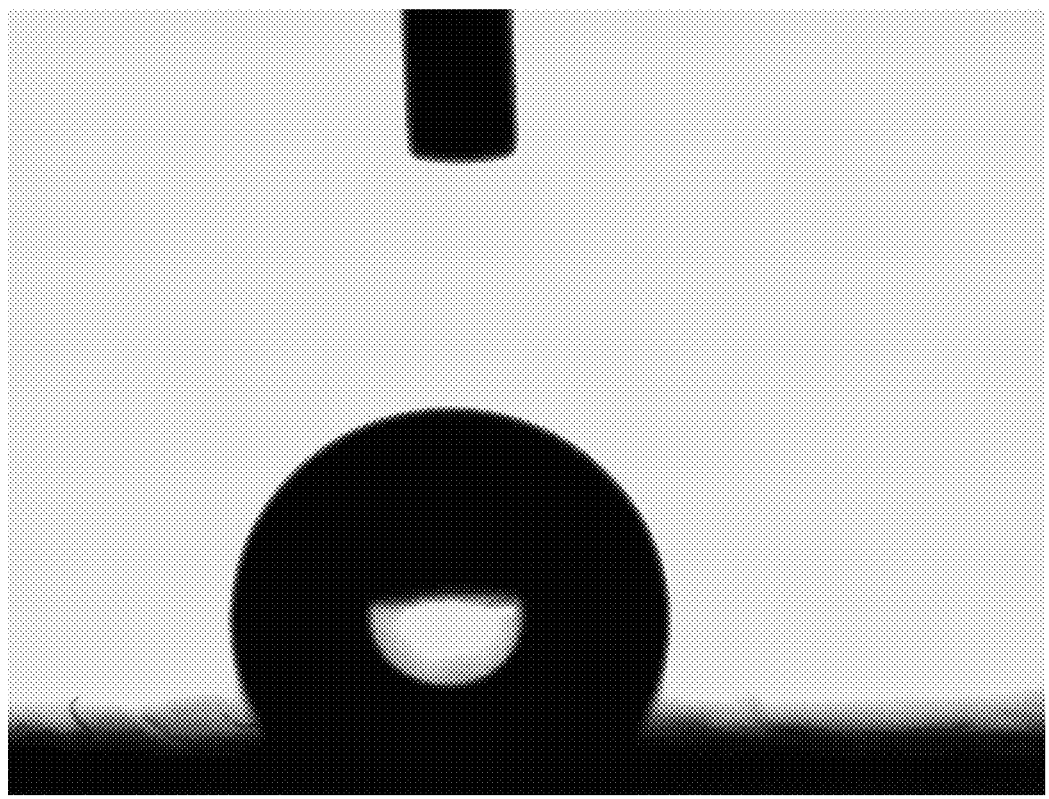
Figure 17:
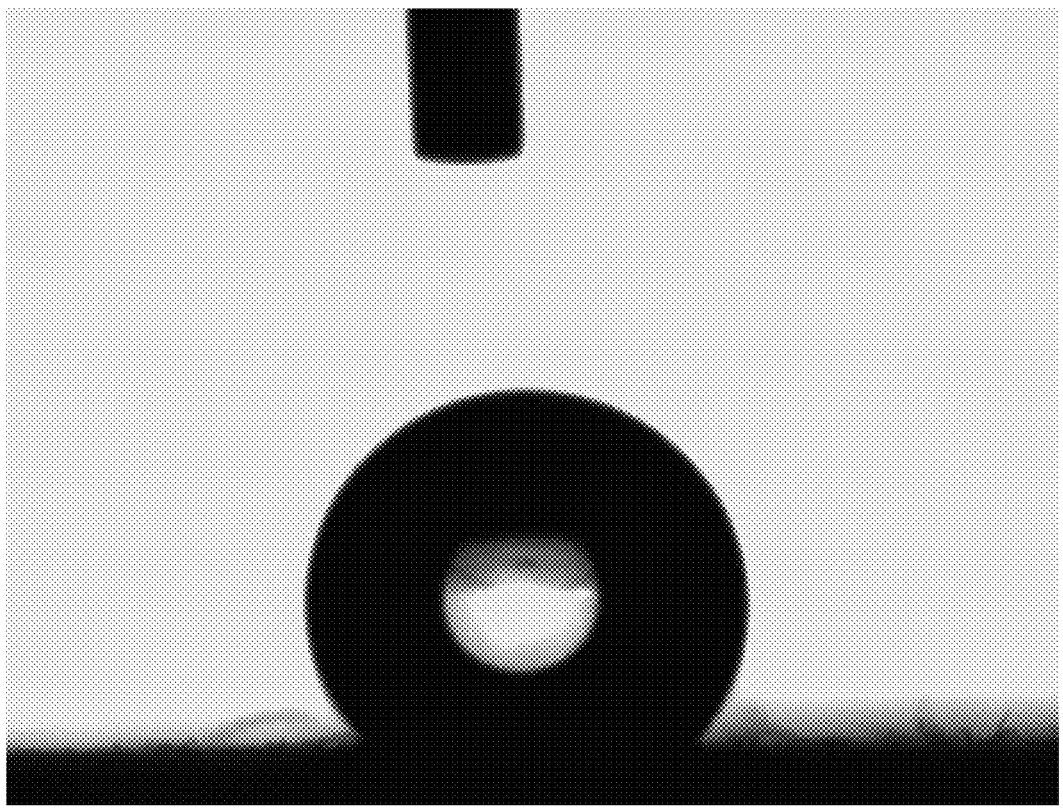

FIGS. 15-17 are diagrams showing the hydrophobic performance of water droplets on the printed part obtained in embodiment 5, wherein the corresponding mass percentages of the hydrophobic fumed silica in the composite are 0.1 wt %, 0.5 wt % and 0.6 wt %, respectively. The contact angles of the water droplets on the printed part in FIGS. 15-17, are 0°, 112° and 132°, respectively. The printed sample was then subjected to a wear-resistance test, which was put on a sandpaper with 180 meshes, followed by placing a 100 g weight on the printed sample, moving the printed sample horizontally back and forth 10 cm as one cycle. The change of the contact angles after different abrasion cycles were tested, as shown in FIG. 7.

Embodiment 6

The embodiment of this application provides composites with controllable superhydrophilic and superhydrophobic interface performances, comprising the following raw materials: hydrophilic powder and jointing phase powder. The jointing phase powder selected hydrophilic phenolic resin (purchased from Henan Borun New Material Co., Ltd.). The hydrophilic powder selected hydrophilic glass beads (purchased from Yuefeng Grinding Co., Ltd.). The average particle sizes of the hydrophilic glass beads and the hydrophilic phenolic resin were ~38 μm and ~30 μm, respectively.

Specifically, the masses of the hydrophilic glass beads and the hydrophilic phenolic resin are shown in Table 6.

TABLE 6

Masses of hydrophilic glass beads and hydrophilic phenolic resin

| Mass percentage of glass beads in the composites | Mass of hydrophilic phenolic resin | Mass of hydrophilic glass beads |
| --- | --- | --- |
| 60 wt % | 2000 g | 3000 g |
| 70 wt % | 1500 g | 3500 g |
| 80 wt % | 1000 g | 4000 g |
| 90 wt % | 500 g | 4500 g |

The preparation method for the composites with controllable superhydrophilic and superhydrophobic interface performances comprises the following steps: the hydrophilic glass beads and the hydrophilic phenolic resin were put in a ball mixer to be uniformly mixed at 400-800 r/min, and then sieved with a 80-mesh sieve to obtain the composites.

The embodiment of this application further provides a 3D printing method, comprising the following steps:

S1. The composites with controllable superhydrophilic and superhydrophobic interface performances according to embodiment 6 were provided;

S2. According to the 3D model for the to-be-manufactured printed part in FIG. 3, the selective laser sintering process was used to enable the composites with controllable superhydrophilic and superhydrophobic interface performances to be formed.

Specifically, when the mass percentage of the hydrophilic glass beads in the composites with controllable superhydrophilic and superhydrophobic interface performances is 60 wt %, the printing parameters are as follows: the preheating temperature of 70° C., the laser power of 5 W, the laser scan velocity of 1000 mm/s, the scanning interval of 0.1 mm and the layer thickness of 0.1 mm.

When the mass percentage of the hydrophilic glass beads in the composites with controllable superhydrophilic and superhydrophobic interface performances increase to 70 wt %, 80 wt % and 90 wt %, the laser scanning power needs to increase to 5.5 W, 6 W and 6.5 W, respectively. When the printing process completes, the printed parts require to be naturally cooled for 1 h before being taken out.

Figure 18:
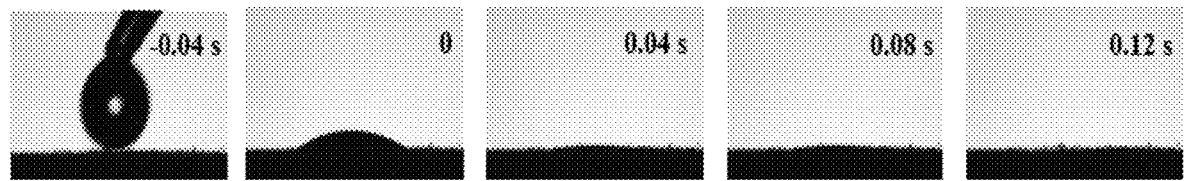
FIG. 18 is the diagram showing the time-sequenced change of contact angles of water droplets on the surfaces of the printed parts obtained in embodiment 6.

FIG. 18 shows the test chart of time-sequenced contact angles of a water droplet on the surface of a printed part (the mass percentage of glass beads is 80 wt %) obtained in embodiment 6. The final contact angle of the water drops on the surface of the printed part is 0°. Specifically, the test method of water contact angle in air comprises the following steps: 5 μL water droplet is added onto the sample surface, and the change of water contact angles on the sample surface was recorded with a contact angle meter.

Figure 19:
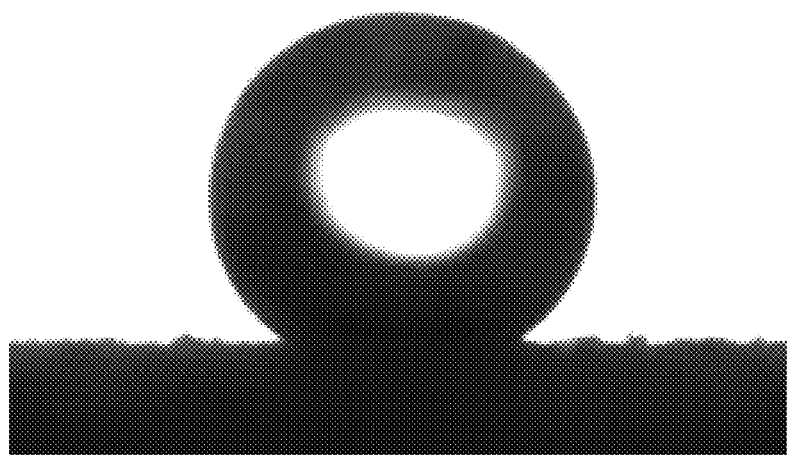
FIG. 19 is the diagram showing the underwater contact angle of carbon tetrachloride droplet on the printed part obtained in embodiment 6.

FIG. 19 shows the underwater contact angle of carbon tetrachloride on the printed part (the mass percentage of glass beads is 80 wt %) obtained in embodiment 6. Underwater test comprises the following steps: the printed part is placed underwater, and then 5 μL carbon tetrachloride is added onto the printed part. FIG. 19 shows that the contact angle of carbon tetrachloride under water is 156±3°, which indicates that the printed part prepared by the invention has good underwater oleophobic performance.

Figure 20:
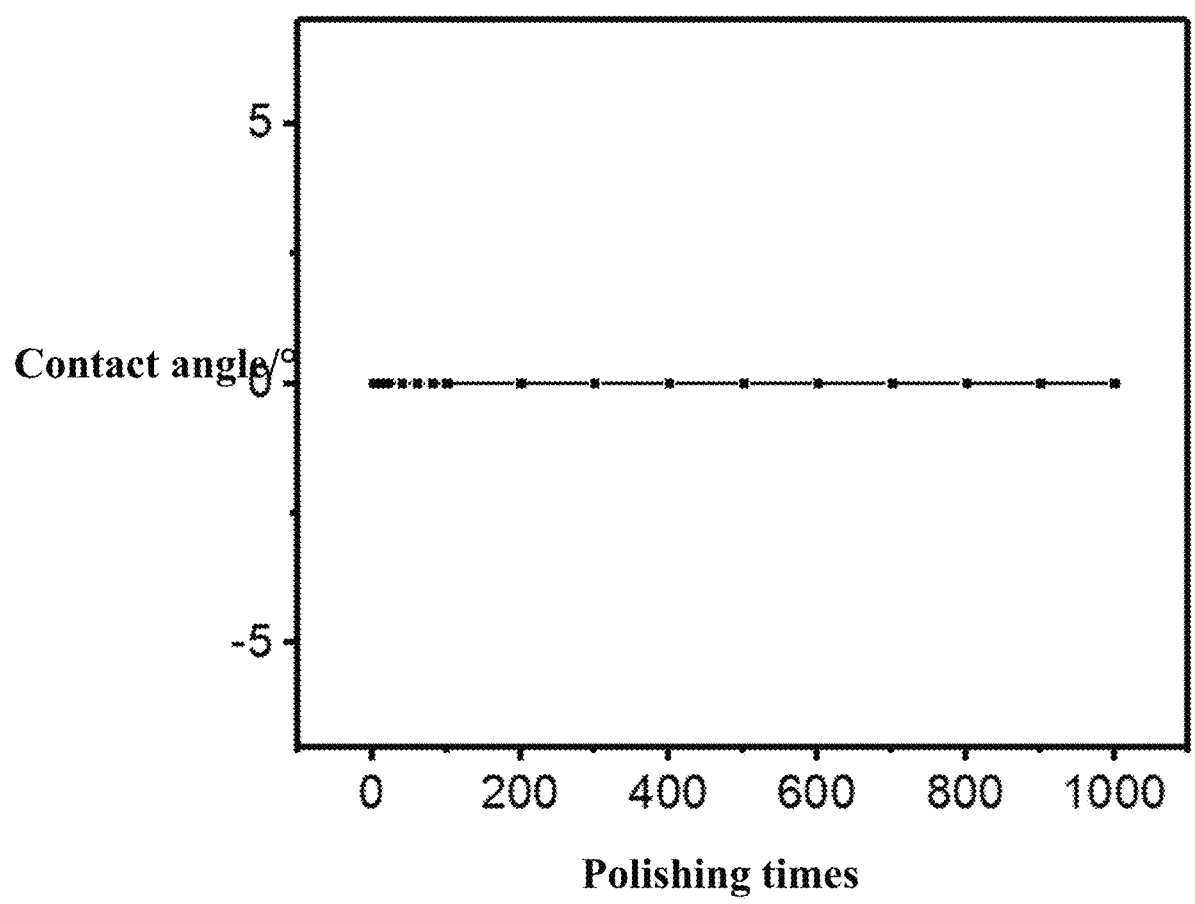
FIG. 20 is the schematic diagram of the relationship between friction cycles and water contact angles on the surfaces of the printed parts obtained in embodiment 6.

FIG. 20 is the schematic diagram of the relationship between the polishing cycles with flocking sandpaper (the mass percentage of glass beads is 80 wt %) and the contact angle of water droplets on the surface of the printed part. FIG. 20 shows that the superhydrophilic part prepared by the present invention has excellent wear resistance. The contact angle is still 0° after being polished with flocking sandpaper for 1000 times.

Embodiment 7

The embodiment of this application provides composites with controllable superhydrophilic and superhydrophobic interface performances, comprising the following raw materials: hydrophobic powder and jointing phase powder. The jointing phase powder selected polypropylene (purchased from Wanhua Chemical Group Co., Ltd.). The hydrophobic powder selected hydrophobic fumed silica (purchased from Evonik Industries AG). The average particle sizes of the polypropylene and the hydrophobic fumed silica were ~50 μm and ~35 nm, respectively.

Specifically, the masses of the polypropylene and the hydrophobic fumed silica are shown in Table 7.

TABLE 7

Masses of polypropylene and hydrophobic fumed silica

| Mass percentage of hydrophobic fumed silica in composite | Mass of polypropylene | Mass of hydrophobic fumed silica |
|---|---|---|
| 4 wt % | 1920 g | 80 g |
| 5 wt % | 1900 g | 100 g |
| 6 wt % | 1880 g | 120 g |

The preparation method for the composites with controllable superhydrophilic and superhydrophobic interface performances comprise the following steps: the polypropylene and the hydrophobic fumed silica were put in a ball mixer to be uniformly mixed at 400-800 r/min, and the mixture was sieved with a 80-mesh sieve to obtain the composites.

The embodiment of this application further provides a 3D printing method, comprising the following steps:

S1. The composites with controllable superhydrophilic and superhydrophobic interface performances according to embodiment 7 were provided;

S2. According to the 3D model for the to-be-manufactured printed part in FIG. 4, the selective laser sintering process was used to enable the composites with controllable superhydrophilic and superhydrophobic interface performances to be formed.

Specifically, when the mass percentage of the hydrophobic fumed silica in the composites with controllable superhydrophilic and superhydrophobic interface performances is 4 wt %, the printing parameters are as follows: the preheating temperature of 130° C., the laser power of 23 W, the laser scan velocity of 4000 mm/s, the scanning interval of 0.1 mm and the layer thickness of 0.1 mm.

When the mass percentages of the hydrophobic fumed silica in the composites with controllable superhydrophilic and superhydrophobic interface performances increase to 5 and 6 wt %, the laser scanning powers need to increase to 26 W and 29 W, respectively. When the printing process completes, the printed parts require to be naturally cooled for 1 h before being taken out.

Figure 21:
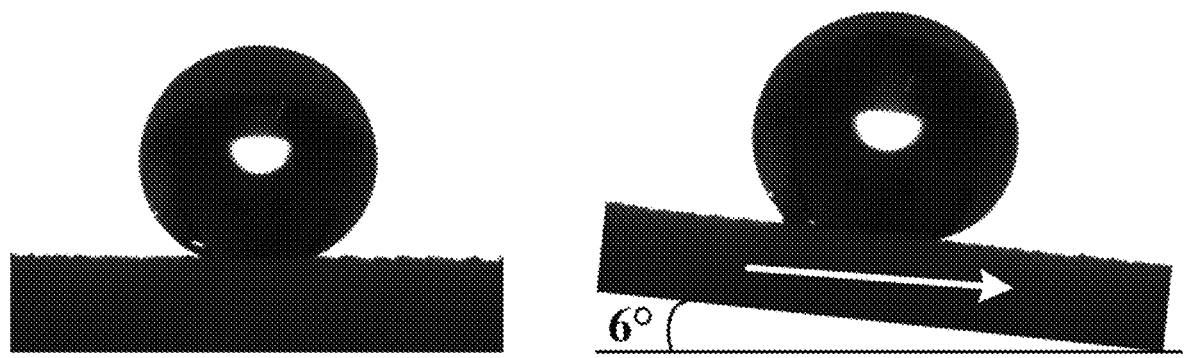
FIG. 21 is the diagram showing the hydrophobicity of water droplets on the printed parts obtained in embodiment 7.

FIG. 21 is the diagram of water contact angle and sliding angle on the printed part (the mass percentage of the hydrophobic fumed silica is 4%) obtained in embodiment 7, which has a contact angle of 158-162° and a roll angle of 5-8°. The contact angle and the roll angle were tested in air environment, wherein the contact angle was recorded by adding 5 μL of water droplet on the surface of the printed part, while the sliding angle is recorded by adding 10 μL of water droplet on the surface of the printed part.

Figure 22:
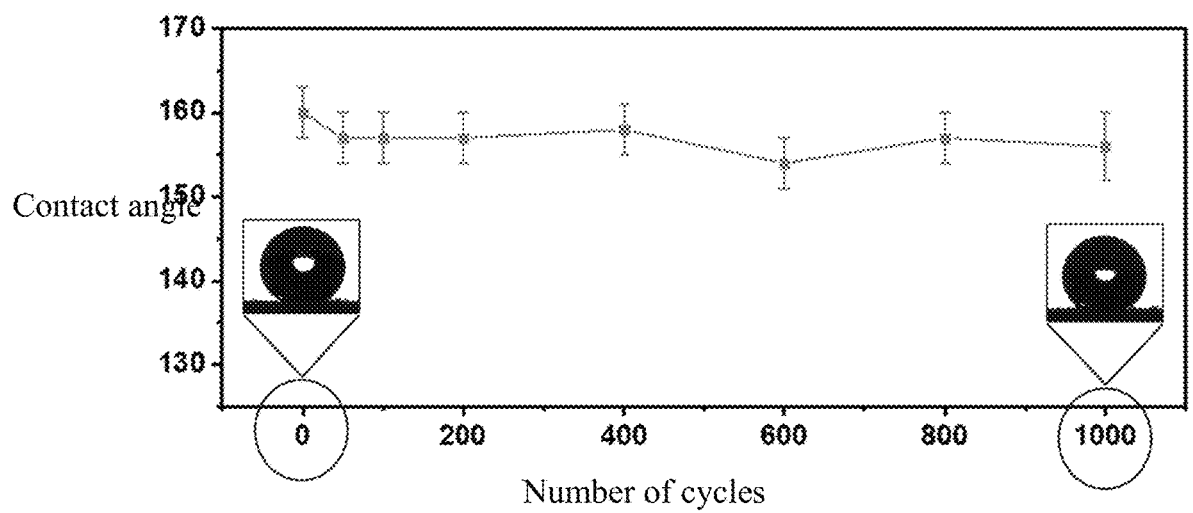
FIG. 22 is the schematic diagram of the relationship between friction cycles and water contact angles on the surface of the printed part obtained in embodiment 7.

FIG. 22 is the statistical diagram of water contact angles on the printed part in embodiment 7 after the $50^{th}$, $100^{th}$, $200^{th}$, $400^{th}$, $600^{th}$, $800^{th}$ and $1000^{th}$ abrasion tests. The superhydrophobic printed part prepared by the present invention has excellent wear resistance, and the contact angle remains still ~155° after $1000^{th}$ abrasion tests.

What is claimed is:

1. A 3D printing method, comprising following steps:
providing composites with controllable superhydrophilic and superhydrophobic interface performances; and
according to a 3D model for the to-be-manufactured printed part, using a selective laser sintering process to enable the composites to be formed to obtain printed parts;
wherein if the composites comprise hydrophobic powdery hydrophilic powder and jointing phase powder, printing parameters are as follows: a laser power is 4-20 W, a scanning speed is 500-4000 mm/s, and a temperature of the forming cylinder is 25-150° C; the jointing phase powder is thermoplastic polymers; and the composites comprise the following components in parts by weight: 0.001-5 parts of hydrophobic powder, parts of hydrophilic powder and 10-100 parts of jointing phase powder; the hydrophobic powder is hydrophobic fumed silica; the hydrophilic powder comprises at least one of hydrophilic glass bead and hydrophilic calcium carbonate; the thermoplastic polymers comprises at least one of polypropylene, epoxy resin, phenolic resin; a particle size of the hydrophobic powder, the hydrophilic powder and the jointing phase powder is 0.5~50 μm;
wherein if the composites comprise hydrophobic powder and jointing phase power, a particle size of the jointing phase powder is 1-100 μm; the hydrophobic powder is hydrophobic fumed silica, and a particle size of hydrophobic fumed silica is 5-100 nm; the jointing phase powder is polypropylene, a mass percentage of the hydrophobic powder in the composites is 4-6%; printing parameters are as follows: a temperature of the forming cylinder is 130° C., a laser power is 23-29 W, a scanning speed is 4000 mm/s, a scanning interval is 0.1 mm, and a layer thickness is 0.1 mm;
wherein if the composites comprise hydrophilic powder and jointing phase powder, the hydrophilic powder is hydrophilic glass bead, and a particle size of hydrophilic glass bead is 1-75 μm; the jointing phase powder is hydrophilic phenolic resin, and a particle size of the jointing phase powder is 1-100 μm; a mass percentage of the hydrophilic glass bead in the composites is 60-90%; printing parameters are as follows: a temperature of the forming cylinder is 70° C., a laser power is 5-6.5 W, a scanning speed is 1000 mm/s, a scanning interval is 0.1 mm, and a layer thickness is 0.1 mm.

\* \* \* \* \*